United States Patent [19]

Goodzeit et al.

[11] Patent Number: 5,025,381
[45] Date of Patent: Jun. 18, 1991

[54] ATTITUDE CONTROL COMPENSATOR FOR FLEXIBLE SPACECRAFT

[75] Inventors: Neil E. Goodzeit, East Windsor, Township, Mercer County, N.J.; David M. Linder, Buckingham Township, Bucks County, Penn.

[73] Assignee: General Electric Company, East Windsor, N.J.

[21] Appl. No.: 459,627

[22] Filed: Jan. 2, 1990

[51] Int. Cl.$^5$ .................. G06F 15/50; B64G 1/36
[52] U.S. Cl. ............................ 364/434; 364/459; 244/171
[58] Field of Search ............... 364/434, 459, 161, 162, 364/163; 244/164, 165, 169, 171

[56] References Cited

U.S. PATENT DOCUMENTS

| | | | |
|---|---|---|---|
| 4,294,420 | 10/1981 | Broquet | 244/165 |
| 4,549,123 | 10/1985 | Hägglund et al. | 318/610 |
| 4,556,956 | 12/1985 | Dickenson et al. | 364/162 |
| 4,591,118 | 5/1986 | Chan | 244/171 |
| 4,727,472 | 2/1988 | Deutsch et al. | 364/183 |
| 4,879,643 | 11/1989 | Chakravarty et al. | 364/148 |
| 4,958,788 | 9/1990 | Namera et al. | 244/169 |

*Primary Examiner*—Thomas G. Black
*Attorney, Agent, or Firm*—William H. Meise

[57] ABSTRACT

An attitude control loop for a spacecraft uses a proportional-integral-derivative (PID) controller for control about an axis. The spacecraft body has at least a primary mechanical resonance. The attitude sensors are collocated, or both on the rigid portion of the spacecraft. The flexure attributable to the resonance may result in instability of the system. A compensator for the control loop has an amplitude response which includes a component which rolls off beginning at frequencies below the resonance, and which also includes a component having a notch at a notch frequency somewhat below the resonant frequency. The phase response of the compensator tends toward zero at low frequencies, and tends toward $-180°$ as frequency increases toward the notch frequency. At frequencies above the notch frequency, the phase decreases from $+180°$, becoming more negative, and tending toward $-90°$ at frequencies far above the resonance frequency. Near the resonance frequency, the compensator phase is near zero.

9 Claims, 3 Drawing Sheets

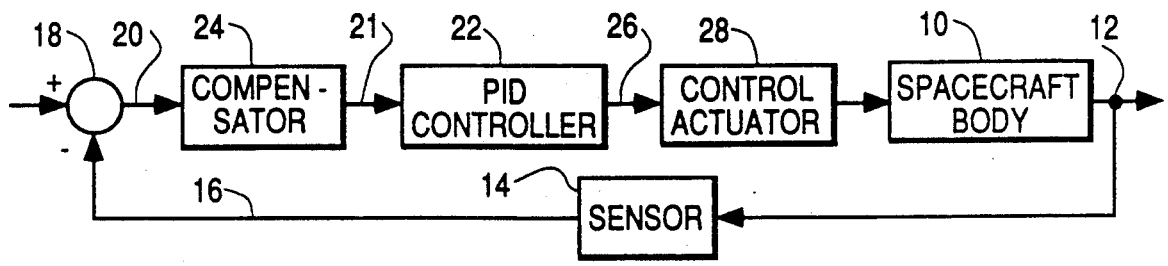
FIG. 1
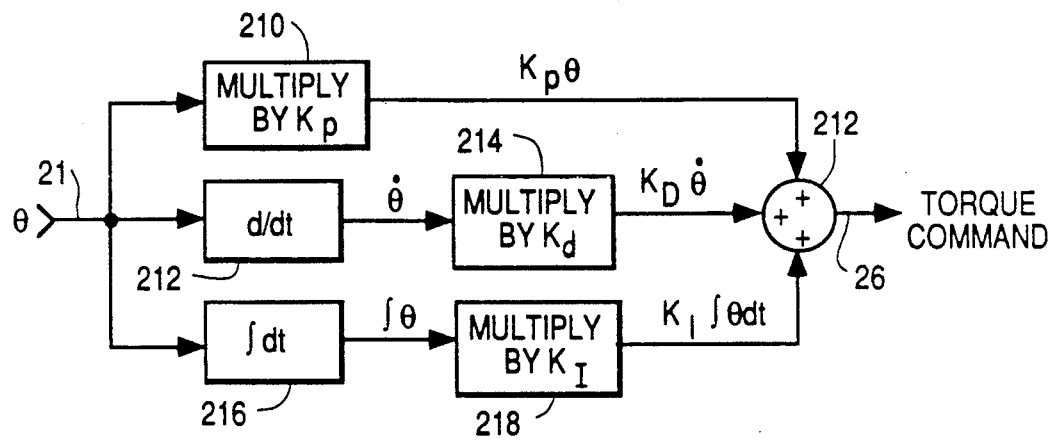
FIG. 2
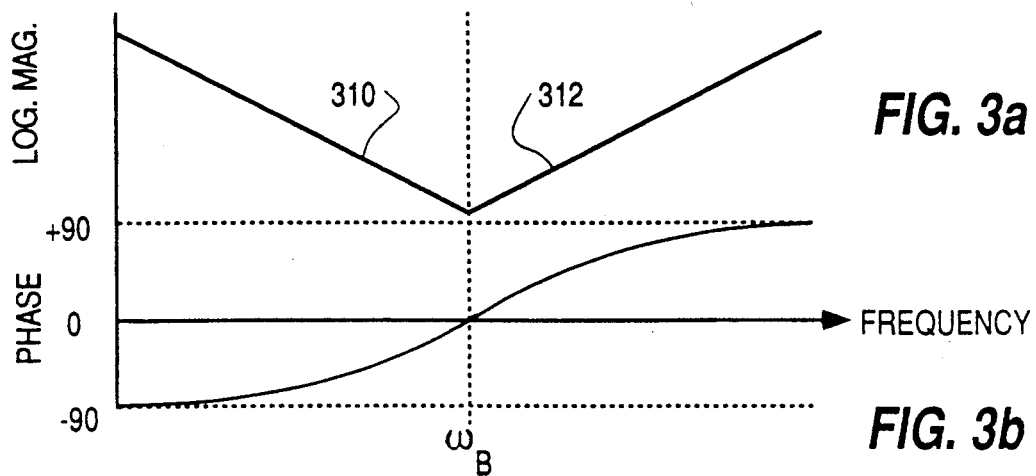
FIG. 3a
FIG. 3b

ATTITUDE CONTROL COMPENSATOR FOR FLEXIBLE SPACECRAFT

The invention described herein was made in the performance of work under NASA Contract No. NAS5-32000 and is subject to the provisions of Section 305 of the National Aeronautics and Space Act of 1958, as amended (72 STAT.435; 42 U.S.C. 2457).

BACKGROUND OF THE INVENTION

This invention relates to attitude control of spacecraft, and more particularly to stabilization of attitude control when the spacecraft is flexible and has self-resonant frequencies.

Spacecraft may require attitude control so that instruments or thrusters mounted thereon may be aligned in a particular direction. Attitude control is provided by torquers which may be in the form of thrusters, reaction wheels, magnetic coils and the like designed to generate rotational moments about particular axes for reorienting or maintaining a spacecraft's attitude.

The current attitude of a spacecraft may be determined by attitude sensors, among which are included star sensors, horizon sensors, sun sensors and the like. The attitude sensors produce attitude-representative signals which are compared with the desired attitude, to produce an attitude error signal for each axis to be controlled. When feedback control of the attitude is desired, the error signal is processed to form a torque command signal for application to the torquer. Such an arrangement forms a control loop of which the spacecraft dynamics constitute a part. Those skilled in the art know that such control systems may tend to become unstable, due to improper phasing between the sensed attitude error and the torque command signal, unless the error signal is processed for low gain near regions of phase inversion.

A particular type of processing of the error signal includes a low pass filter cascaded with a network which provides the combination of a proportional, a derivative and an integrating action, as described in U.S. Pat. No. 4,294,420. Such low pass filters have an amplitude characteristic which rolls off or decreases above a predetermined frequency. When the spacecraft has a primary mechanical resonance (the lowest-frequency, large-amplitude resonance), the roll-off or crossover frequency of the filter is selected by rule-of-thumb to be at about one-tenth of the primary mechanical resonance. As a consequence, the control loop crossover (unity gain) frequency is separated from the primary mechanical resonance frequency by more than a factor of ten. The closer the crossover frequency is made to approach the primary mechanical resonance frequency, the smaller the attitude errors. A loop gain which is greater than zero is necessary in order to reduce the amplitude of attitude errors. Thus, an improved controller/filter network is desired.

SUMMARY OF THE INVENTION

An attitude controller for a spacecraft includes torquers coupled to the spacecraft body for torquing the body to change its attitude. Sensors are coupled to the body for sensing its attitude. The sensors generate signals indicative of the deviation of the attitude away from a desired attitude. A PID control arrangement operates on attitude error signals for summing first, second and third products. The first product is formed by multiplying a constant by the attitude error signal, the second product is formed by multiplying a second constant by the time derivative of the attitude error signal, and the third product is formed by multiplying a third constant by the time integral of the attitude error signal. The torquer, the sensor and the PID controller are coupled together by a coupling arrangement to form a control path responsive to the attitude error signals. The control path extends from the sensors to the torquer for stabilizing the attitude of the spacecraft body. The coupling arrangement further includes a compensator cascaded with the PID controller. The compensator has a transfer function including a gain function which is substantially constant at frequencies below about $\omega/7$, and also includes a component representing a monotonic decrease in gain from $\omega/7$ notch component at a frequency $\omega$. Frequency $\omega$ is selected to be slightly below the primary self resonant frequency of the spacecraft body. The transfer function of the compensator also includes a phase response which tends towards 0° as frequency decreases from $\omega/7$, which progressively lags toward $-180°$ as frequency increases from $\omega/7$ towards $\omega$, and which has a value of $+180°$ at $\omega$, which becomes monotonically more negative and tends toward $-90°$ at frequencies far above $\omega$.

DESCRIPTION OF THE DRAWING

FIG. 1 is a simplified block diagram of a spacecraft with a control loop according to the invention;

FIG. 2 is a simplified block diagram of a PID controller useful in the arrangement of FIG. 1;

FIG. 3a illustrates magnitude, and FIG. 3b phase, characteristics of the arrangement of FIG. 2;

DESCRIPTION OF THE INVENTION

Figure 4A:
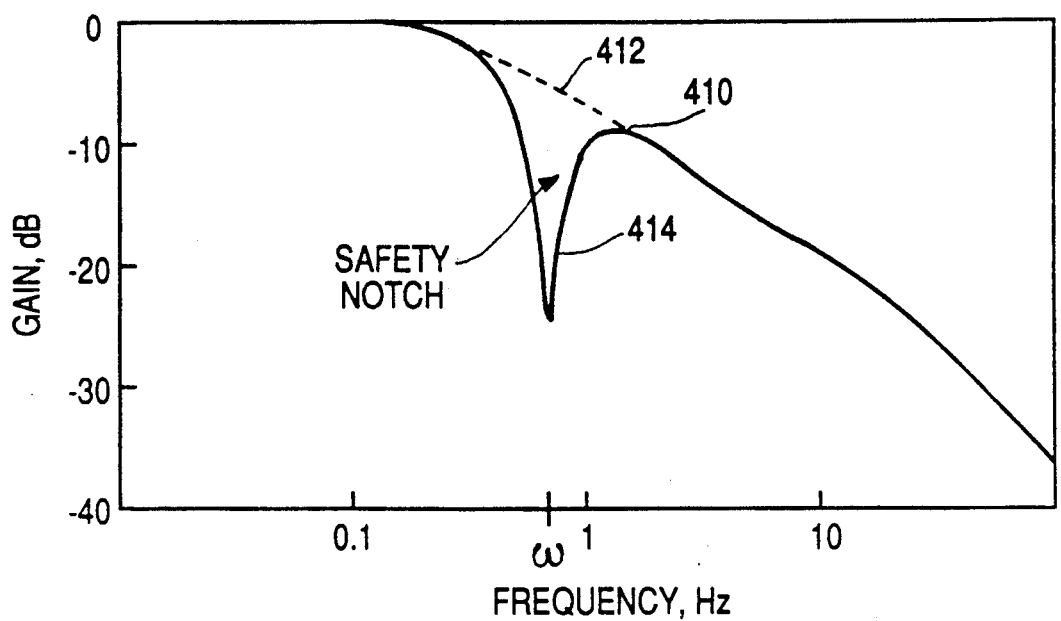
FIGS. 4a and 4b represent computer-simulated amplitude and phase characteristic, respectively, of a compensator useful in the arrangement according to the invention.

In the control loop of FIG. 1, the spacecraft body is represented by 10, the attitude of which is represented by a node 12. A sensor arrangement illustrated as a block 14 is mechanically connected to the rigid portion of spacecraft body 10, senses the attitude of the spacecraft at node 12, and produces signals on a bus 16 which are representative of the attitude of the spacecraft on the relevant axis. The attitude-representative signals are applied to a subtractor 18 which receives attitude command signals from a source (not illustrated) at its noninverting (+) input terminal, and which produces attitude error signals on a bus 20. The attitude error signals are coupled to a PID controller illustrated as a block 22 by way of a bus 21 and a compensator illustrated as a block 24. PID controller 22 produces torque command signals on a bus 26 for application to control actuators illustrated as a block 28. The control actuators may be thrusters, reaction wheels and the like mechanically connected to the rigid portion of the spacecraft body, and suited to the requirement for torquing the spacecraft. Control actuator 28 produces torque under the control of the torque command signal and is coupled to spacecraft body 10 for correcting attitude errors.

FIG. 2 is a simplified block diagram illustrating details of PID controller 22 of FIG. 1. Elements of FIG.

2 corresponding to those of FIG. 1 are designated by like reference numerals. In FIG. 2, an attitude error signal $\theta$ is received by way of bus 21 and is applied to a multiplier 210 which multiplies by a constant $K_p$, and the product $K_p\theta$ is applied to a first input of a summing circuit 212. The attitude error input signal $\theta$ is also applied to a time derivative function illustrated as a block 212, which takes the time derivative of $\theta$ to produce $\dot\theta$, and applies $\dot\theta$ to a block 214 for multiplication by another constant $K_d$. The product $K_d\dot\theta$ is applied to a second input of summing circuit 212. Attitude error signal $\theta$ is also applied to an integrator illustrated as a block 216, which produces a time integral of $\theta$ to produce $\int\theta dt$, which is applied to a multiplier 218. Multiplier 218 multiplies by $K_I$ to produce $K_I\int\theta dt$, which is applied to a third summing input of summing circuit 212. Summing circuit 212 sums together the proportional, derivative and integral products to produce the torque command signal on bus 26.

FIG. 3 illustrates idealized transfer characteristic of the arrangement of FIG. 2. In FIG. 3a, the magnitude component of the transfer function is illustrated as a plot of the logarithm of magnitude versus frequency. The transfer function of FIG. 3a includes a first straight-line component 310 which decreases at a rate of 20dB/decade of frequency to a break frequency $\omega_B$, and at frequencies higher than $\omega_B$ includes a second straight-line segment 312, which has an increase at a rate of 20dB per decade. Frequency $\omega_B$ is equal to the square root of $K_I/K_R$. Those skilled in the art know that the actual transfer function will deviate from the ideal, and that the gain will differ by about +3 dB at frequency $\omega_B$.

As mentioned, the prior art arrangement includes a low-pass filter (not illustrated) cascaded with the PID circuit of FIG. 2, which rolls off or decreases in amplitude, so as to reduce overall gain at high frequencies. The roll off frequency of the low-pass filter is selected so that, at the frequency of the first spacecraft resonance, the open-loop gain of the control system is below unity gain, to thereby guarantee loop stability.

FIG. 3b illustrates the phase characteristic of the arrangement of FIG. 2. As illustrated in FIG. 3b, the phase characteristic is near $-90°$ at low frequencies, and increases or becomes more positive monotonically until it reaches $0°$ at frequency $\omega_B$. The monotonic increase in phase continues at frequencies above $\omega_B$, and the phase approaches $90°$ asymptotically at high frequencies.

The transfer characteristics of the PID controller are given by $$G_{PID} = 1/s\,(K_R s^2 + K_P s + K_I) \quad (1)$$

where $K_R$ is a constant relating attitude deviation rate to the resulting torque, $K_P$ is a constant relating attitude to torque, and $K_I$ is a constant relating the integral of attitude to torque.

In a particular example, for a given inertia I of the control loop axis, Equation (1) becomes $$G_{PID}(s) = (I\omega^3/783.00)\frac{204.00\omega^{-2}s^2 + 14.29\omega^{-1}s + 1.0}{s} \quad (2)$$

In accordance with the invention, compensator 24 adjusts the phase and gain characteristics of the loop. As illustrated, compensator 24 adjusts the phase and gain characteristics of the feedback attitude error for application to the input of the PID controller. The PID controller outputs torque commands to control actuator 28 in response to the compensated attitude error signals.

In the particular example for which the PID controller characteristic is given by Equation (2), compensator 24 of FIG. 1 has a transfer function given by $$G_c(s) = \frac{2.50\omega(s^2 - 0.10\omega s + \omega^2)(s + 8.00\omega)}{(s + \omega)(s^2 + 1.20\omega s + \omega^2)(s + 20.00\omega)} \quad (3)$$

Frequency $\omega$ is selected somewhat lower than the primary self-resonance of the spacecraft. In the example illustrated in FIGS. 4 and 5 and described below, frequency $\omega$ is about 82 percent of the self-resonant frequency.

FIG. 4a illustrates as a plot 410 the amplitude characteristic of the compensator 24, pursuant to Equation 3. As illustrated in the example of FIG. 4a, frequency $\omega$ corresponds to about 0.7 Hz. Curve 410 of the example of FIG. 4a has a magnitude of 0dB below about 0.1 Hz, corresponding to about $\omega/7$. Curve 410 (including dashed-line portion 412) includes what amounts to a monotonic decrease in gain above a frequency of $\omega/7$, upon which is superimposed a notch component illustrated as 414, which reduces the gain by about 20dB at its deepest point, relative to the projection 412 of the monotonic-decrease portion of curve 410. Notch 414 is centered on a frequency $\omega$. Notch 414 may be termed a "safety notch". Its purpose is to reduce the loop gain sharply at frequencies just below the primary mechanical resonance frequency, so that if the calculated frequency of the primary mechanical resonance is slightly too high, the system will still be stable. It also provides a desired phase characteristic.

Figure 4B:
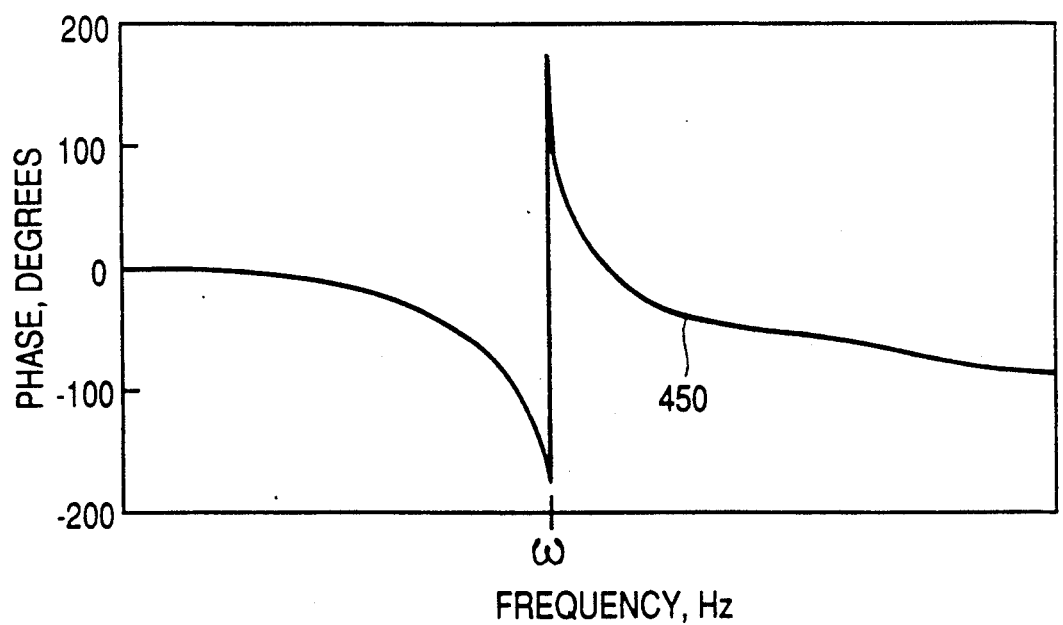

FIG. 4b illustrates as a curve 450 the phase response of compensator 24 in accordance with Equation 3. In FIG. 4b, curve 450 has a phase response of essentially $0°$ at frequencies well below $\omega$, decreasing monotonically toward $-180°$ at frequencies slightly below $\omega$. At frequencies slightly above $\omega$, the phase is near $+180°$, decreasing monotonically toward $-90°$ at frequencies far above $\omega$, and passing through $0°$ at a frequency near 1 Hz.

Figure 5A:
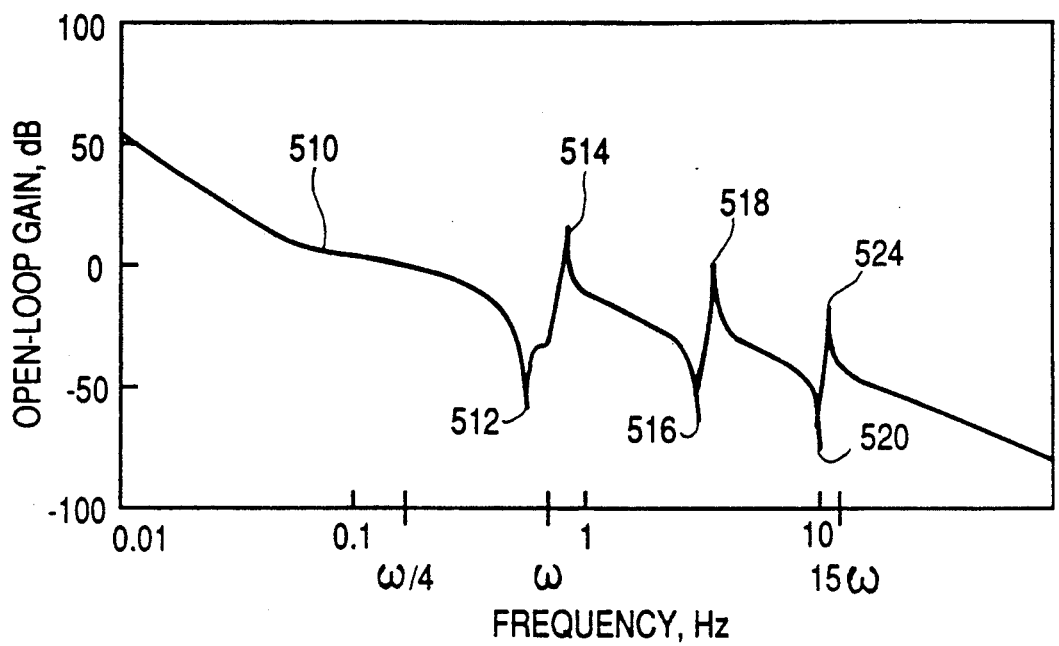
FIGS. 5a and 5b illustrate computer-simulated amplitude and phase characteristics, respectively, of an open-loop control circuit according to the invention in association with a spacecraft.

FIG. 5a illustrates the amplitude component of the open-loop frequency response of a spacecraft using a PID controller and compensator according to the invention. In the example of FIG. 5a, plot 510 has a gain of 50 dB at frequencies near 0.01 Hz. The gain decreases and passes through unity (zero dB) at a frequency of about 0.15 Hz, corresponding to one-fifth of the frequency of safety notch 414 of FIG. 4a. From a frequency of 0.15 Hz, the gain continues to decrease to a first null 512 associated with the primary self-resonance of the spacecraft structure. A peak illustrated as 514 also corresponds to the first self-resonant frequency. Additional self-resonances of lesser amplitude are defined by associated null-peak pairs 516, 518; 520, 524. Safety notch 414 of FIG. 4 is distorted by the rapid amplitude change attributable to the self-resonance characterized by peak 514 and null 512, but its notch is somewhat visible and occurs at frequency $\omega$ around 0.7 Hz.

Figure 5B:
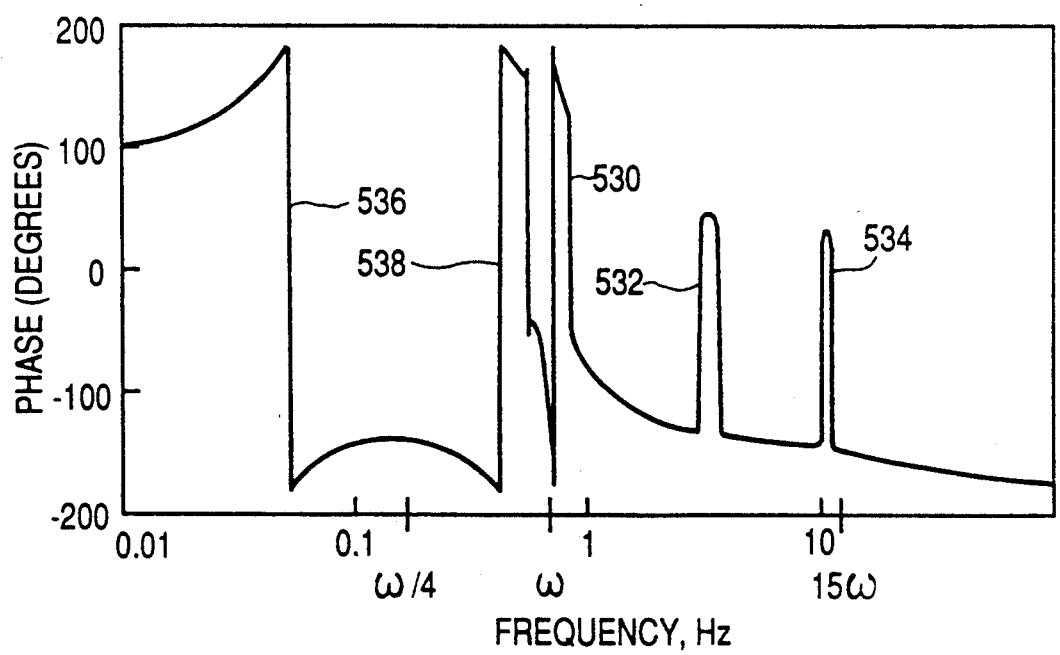

FIG. 5b illustrates the phase response of the open-loop control system. As illustrated in FIG. 5b, the phase is about $-140°$ near the gain zero dB crossover frequency around $\omega/4$. Thus, the rigid-body spacecraft attitude mode is phase stable. The great bandwidth of the loop results in gain exceeding unity near the two lowest-frequency mechanical resonances, i.e. near 0.85 Hz and 3.7 Hz. These mechanical resonances result in large phase changes, which appear in FIG. 5b in the form of phase spikes 530 and 532. In the absence of compensation, these phase spikes might reach 180° coincident with loop gain exceeding unity, and thereby result in destabilization or oscillation. However, compensation in accordance with the invention provides a phase "floor" which, between frequencies $\omega$ and 15$\omega$, drops toward $-180°$ to prevent the peak phase of each of the spikes from reaching 180°. This in turn prevents the phase from reaching 180° when the gain is above unity, preventing destabilization.

As indicated in FIGS. 5a and 5b, the control open-loop bandwidth is defined by crossover frequency 510 at which the amplitude passes through 0 dB gain. This frequency, corresponding to $\omega/4$, is approximately one-fifth the frequency of the peak response attributable to the spacecraft body primary resonant frequency. Consequently, the bandwidth is approximately doubled over the bandwidth which would be achievable using the prior art compensation system. This, in turn, tends to reduce the amplitude of attitude errors.

The stability margins provided by the loop illustrated in FIGS. 5a and 5b are excellent. The low gain margin (the gain margin at the 180° phase transition, illustrated as 536 of FIG. 5b, which is at a frequency immediately below the frequency of unity loop gain) exceeds 9 dB. The high gain margin (the gain margin at the 180° phase transition 538 which occurs at a frequency immediately above the unity gain frequency) exceeds 15 dB, and the phase margin at the frequency of unity gain ($\omega/4$) exceeds 45°. Between frequency $\omega$ and frequency 15$\omega$, the compensated control system provides spacecraft flexural mode phase stabilization as described above. Flexural mode gain stabilization is provided above 15$\omega$ by the very low loop gain. Thus, compensation according to the invention stabilizes the lowest system resonant mode, but allows its gain to exceed 0 dB. Therefore, the closed-loop damping for this mode is significantly greater than that provided by the prior art system. In this example, the damping provided to the primary resonant mode increases by a factor of approximately 10.

Other embodiments of the invention will be apparent to those skilled in the art. In particular, the compensator of FIG. 1 may follow PID controller 22 rather than precede it, since the system is linear. If reaction wheel attitude control is used, the torque command may include compensation and/or dither as described in co-pending application Ser. No. 454,651, entitled "Reaction Wheel Friction Compensation Using Dither," filed about Dec. 20, 1989 in the name of Stetson.

What is claimed is:

1. An attitude controller for a spacecraft having a body defining at least a primary self-resonant frequency, comprising:

torquing means coupled to the spacecraft body for generating torques for changing the attitude of said spacecraft;

sensing means coupled to said body for sensing the attitude thereof and for generating deviation signals indicative of the deviation of the attitude away from a desired attitude;

PID control means for operating on attitude error signals for summing first, second and third products, said first product being formed by multiplying a first constant by said attitude error signals, said second product being formed by multiplying a second constant by the time derivative of said attitude error signals, and said third product being formed by multiplying a third constant by the time integral of said attitude error signals;

coupling means coupled to said torquing means, said sensing means and said PID control means for coupling said PID control means in a control path responsive to said attitude error signals, and extending from said sensing means to said torquing means, for stabilizing said attitude, said coupling means further including compensation means cascaded with said PID control means, said compensation means having a transfer characteristic including a gain function which is substantially constant below a frequency of about $\omega/7$, which gain function includes (a) a component representing a monotonic decrease in gain with increasing frequency from said frequency $\omega/7$, superimposed upon (b) a notch component at a frequency of $\omega$, where $\omega$ is selected to be slightly below the self-resonant frequency of said spacecraft, said transfer function including a phase response which tends toward zero degrees as frequency decreases from said frequency of $\omega/7$, and which progressively lags toward $-180$ degrees with frequency increasing from $\omega/7$ toward $\omega$, and which from a value of $+180$ degrees at $\omega$ becomes monotonically more negative and tends toward $-90$ degrees at frequencies far above $\omega$, whereby said compensation means cascaded with said PID control means responds to said deviation signals for driving said torquing means.

2. A controller according to claim 1 wherein said phase response of said compensation means is near zero degrees at said primary self-resonant frequency of said body.

3. A controller according to claim 1, wherein the transfer characteristic G(s) of said compensation means is defined by $$G(s) = \frac{2.5\omega[s^2 - \omega s/10 + \omega^2][s + 8\omega]}{(s + \omega)[s^2 + 1.2\omega s + \omega^2](s + 20\omega)}$$

4. A controller according to claim 1 wherein the gains of said PID control means and of said compensation means are selected so that the open-loop gain is zero at a frequency of about one-fifth of said frequency of said primary resonance of said spacecraft body.

5. A controller according to claim 1 wherein said torquing means comprises thrusters.

6. A controller according to claim 1 wherein said compensation means is cascaded with said PID control means in such a manner that said compensation means receives said deviation signals from said sensing means and produces said attitude error signals for application to said PID control means, whereby said PID means drives said torquing means.

7. A controller according to claim 1 wherein said PID control means further includes means for summing a fourth product with said first, second and third products, said fourth product being the product of a fourth constant multiplied by a double time integral of said attitude-representative error signals.

8. A controller according to claim 1 wherein said sensing means comprises:

attitude sensor means coupled to said spacecraft body for generating attitude-representative signals; and differencing means coupled to said attitude sensor means and to said coupling means, and adapted to receive an attitude command signal, for forming said deviation signal.

9. A controller according to claim 1 wherein said sensing means and said torquing means are both located on the rigid portion of said spacecraft body.

* * * * *